(12) United States Patent
Mukkavilli et al.

(10) Patent No.: US 11,979,838 B2
(45) Date of Patent: May 7, 2024

(54) TECHNIQUES FOR SETTING POWER OF PEAK REDUCTION TONES

(71) Applicant: QUALCOMM Incorporated, San Diego, CA (US)

(72) Inventors: Krishna Kiran Mukkavilli, San Diego, CA (US); Hung Dinh Ly, San Diego, CA (US); Saeid Sahraei, San Diego, CA (US); Gokul Sridharan, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 191 days.

(21) Appl. No.: 17/364,460

(22) Filed: Jun. 30, 2021

(65) Prior Publication Data

US 2022/0039027 A1 Feb. 3, 2022

Related U.S. Application Data

(60) Provisional application No. 63/058,292, filed on Jul. 29, 2020.

(51) Int. Cl.
*H04W 52/24* (2009.01)
*H04B 17/309* (2015.01)
*H04L 27/26* (2006.01)

(52) U.S. Cl.
CPC ........ *H04W 52/242* (2013.01); *H04B 17/309* (2015.01); *H04L 27/2614* (2013.01)

(58) Field of Classification Search
CPC ........................ H04W 52/242; H04W 52/146; H04B 17/309; H04L 27/2614; H04L 27/2618; H04L 27/261

USPC ......................................................... 370/252
See application file for complete search history.

(56) References Cited

U.S. PATENT DOCUMENTS

| | | | | |
|---|---|---|---|---|
| 2004/0162097 | A1* | 8/2004 | Vijayan .................. | H04L 5/0066 455/522 |
| 2007/0254592 | A1* | 11/2007 | McCallister ......... | H04B 1/0475 455/67.11 |
| 2009/0190464 | A1* | 7/2009 | McCallister ......... | H04B 1/0475 370/329 |

(Continued)

FOREIGN PATENT DOCUMENTS

| | | | | |
|---|---|---|---|---|
| CN | 105960007 B | * | 10/2019 | .......... H04W 52/143 |
| WO | WO-2019032887 A1 | | 2/2019 | |
| WO | WO-2019215709 A1 | * | 11/2019 | ........... H04B 17/309 |

OTHER PUBLICATIONS

Sandoval Francisco et al: "Hybrid Peak-to-Average Power Ratio Reduction Techniques: Review and Performance Comparison", IEEE Access, vol. 5 , pp. 27145-27161, Nov. 29, 2017; XP011674874 (Year: 2017).*

(Continued)

*Primary Examiner* — Hassan Kizou
*Assistant Examiner* — Oladiran Gideon Olaleye
(74) *Attorney, Agent, or Firm* — Norton Rose Fulbright US LLP

(57) ABSTRACT

Wireless communication techniques that include techniques for setting power of peak reduction tones are discussed. A UE may receive a signal. The UE may set power associated with at least one peak reduction tone in accordance with a path loss between the UE and a base station. The path loss may be in accordance with the received signal. Other aspects and features are also claimed and described.

30 Claims, 13 Drawing Sheets

(56) References Cited

U.S. PATENT DOCUMENTS

2009/0274103 A1  11/2009  Yang et al.
2012/0076042 A1* 3/2012  Chun .............. H04W 74/0833
                                              370/252
2018/0083820 A1* 3/2018  Agon .............. H04L 43/0847

OTHER PUBLICATIONS

Ajami A-K., et al., "A Stochastic Optimization Technique for PAPR Reduction in the Uplink of LTE-Advanced with Carrier Aggregation", 2017, 8th International Conference on Information and Communication Systems (ICICS), IEEE, Apr. 4, 2017 (Apr. 4, 2017), pp. 204-209. XP033094364, DOI: 10.1109/IACS.2017.7921972, [retrieved on May 8, 2017] p. 204, right-hand col., line 1-p. 207, right-hand col., line 4.
International Search Report and Written Opinion—PCT/US2021/040083—ISA/EPO—dated Oct. 21, 2021.
Sandoval F., et al., "Hybrid Peak-to-Average Power Ratio Reduction Techniques: Review and Performance Comparison," IEEE Access, vol. 5, Nov. 29, 2017 (Nov. 29, 2017), pp. 27145-27161, XP011674874, DOI: 10.1109/ACCESS.2017.2775859 [retrieved on Dec. 21, 2017], abstract p. 27145, right-hand col., line 18-p. 27146, left-hand col., line 38 p. 27146, left-hand col., line 61-p. 27151, right-hand col., line 12 p. 27154, right-hand col., line 1-p. 27156, right-hand col., line 28.

* cited by examiner

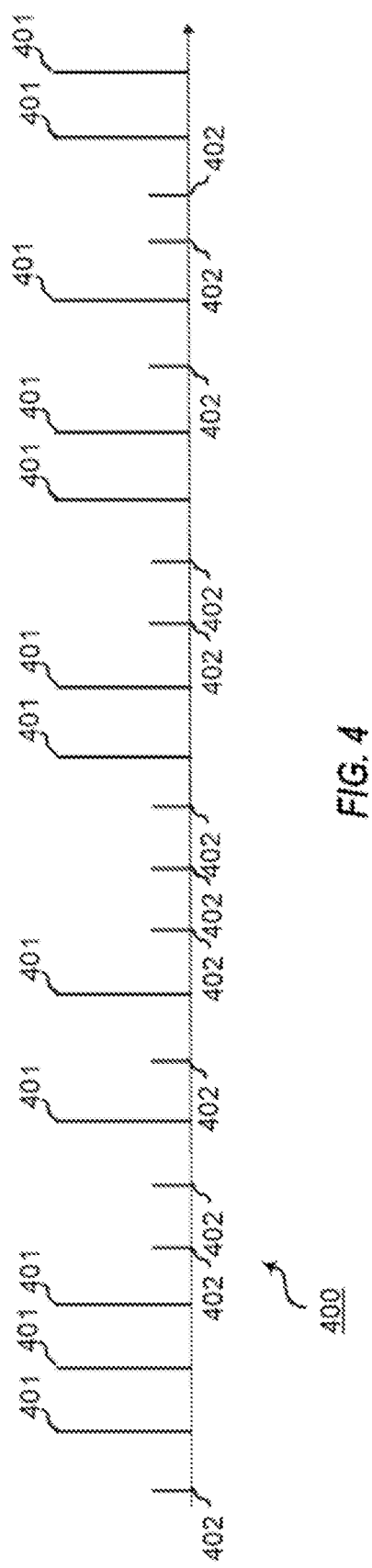

TECHNIQUES FOR SETTING POWER OF PEAK REDUCTION TONES

CROSS-REFERENCE TO RELATED APPLICATIONS

This application claims the benefit of U.S. Provisional Patent Application No. 63/058,292, entitled, "TECHNIQUES FOR SETTING POWER OF PEAK REDUCTION TONES," filed on Jul. 29, 2020, which is expressly incorporated by reference herein in its entirety.

TECHNICAL FIELD

Aspects of the present disclosure relate generally to wireless communication systems, and more particularly, to techniques for setting power of peak reduction tones in wireless communication systems. Certain implementations of the technology discussed below can enable and provide enhanced communication features and techniques for communication systems, including higher data rates, higher capacity, higher performance, better spectral efficiency, higher mobility, lower memory usage, and lower power device operations.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be access networks that support communications for multiple users by sharing the available network resources.

A wireless communication network may include several components. These components may include wireless communication devices, such as base stations (or node Bs) that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

Signal distortion caused by processing of signals for transmission, such as by signal amplification provided by a power amplifier (PA), may also degrade performance on both the downlink and uplink. For example, some signal waveforms suffer from large peak-to-average power ratio (PAPR) which can result in high peaks causing a PA to operate in the nonlinear region. PA operation in the nonlinear region leads to signal distortion and spectral spreading of the signal.

SUMMARY

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication at a UE is provided. For example, a method can include receiving a signal. The method can also include setting power associated with at least one peak reduction tone in accordance with a path loss between the UE and a base station. The path loss is determined in accordance with the received signal.

In another aspect of the disclosure, an apparatus configured for wireless communication is provided. For example, the apparatus can include means for receiving a signal. The apparatus can also include means for setting power associated with at least one peak reduction tone in accordance with a path loss between the apparatus and a base station. The path loss is determined in accordance with the received signal.

In an additional aspect of the disclosure, a non-transitory computer-readable medium having program code recorded thereon is provided. The program code can include program code executable by a computer for causing the computer to receive a signal. The program code can also include program code executable by the computer for causing the computer to set power associated with at least one peak reduction tone in accordance with a path loss that is determined in accordance with the received signal.

In another aspect of the disclosure, an apparatus configured for wireless communication is provided. The apparatus includes at least one processor, and a memory coupled to the processor. The at least one processor can be configured to receive a signal. The at least one processor can also be configured to set power associated with at least one peak reduction tone in accordance with a path loss that is determined in accordance with the received signal.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects or uses may come about via integrated chip implementations and other non-module-component based devices (e.g., end-user devices, vehicles, communication devices, computing devices, industrial equipment, retail devices, purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders, summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label with a second label that distinguishes among the similar components. If just the first reference label is used in the specification, the description is applicable to any one of the similar components having the same first reference label irrespective of the second reference label.

FIG. 4 is an example of peak reduction tones (PRTs) provided with respect to data tones for peak-to-average power ratio (PAPR) reduction operation according to some aspects of the present disclosure.

DETAILED DESCRIPTION

Figure 1:
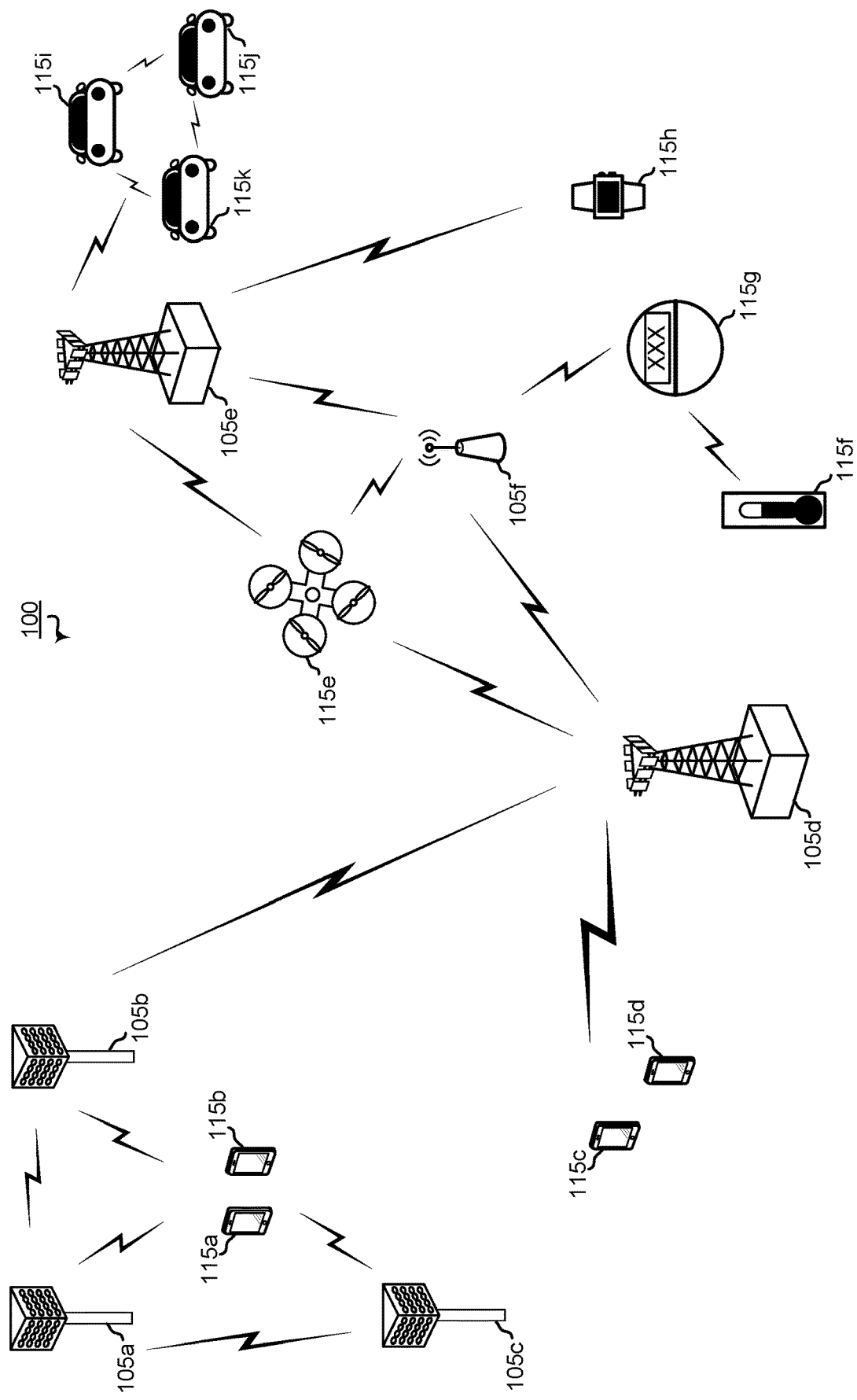
FIG. 1 is a block diagram illustrating details of a wireless communication system according to some aspects of the present disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The Third Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. Additionally, an operator network may also include one or more LTE networks, and/or one or more other networks. The various different network types may use different radio access technologies (RATs) and radio access networks (RANs).

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects descried with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations and/or uses may come about via integrated chip implementations and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described implementations. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 is a block diagram illustrating details of an example wireless communication system. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component device/module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink and/or uplink, or desired transmission between base stations, and backhaul transmissions between base stations. UEs may operate as base stations or other network nodes in some scenarios. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105e.

Figure 2:
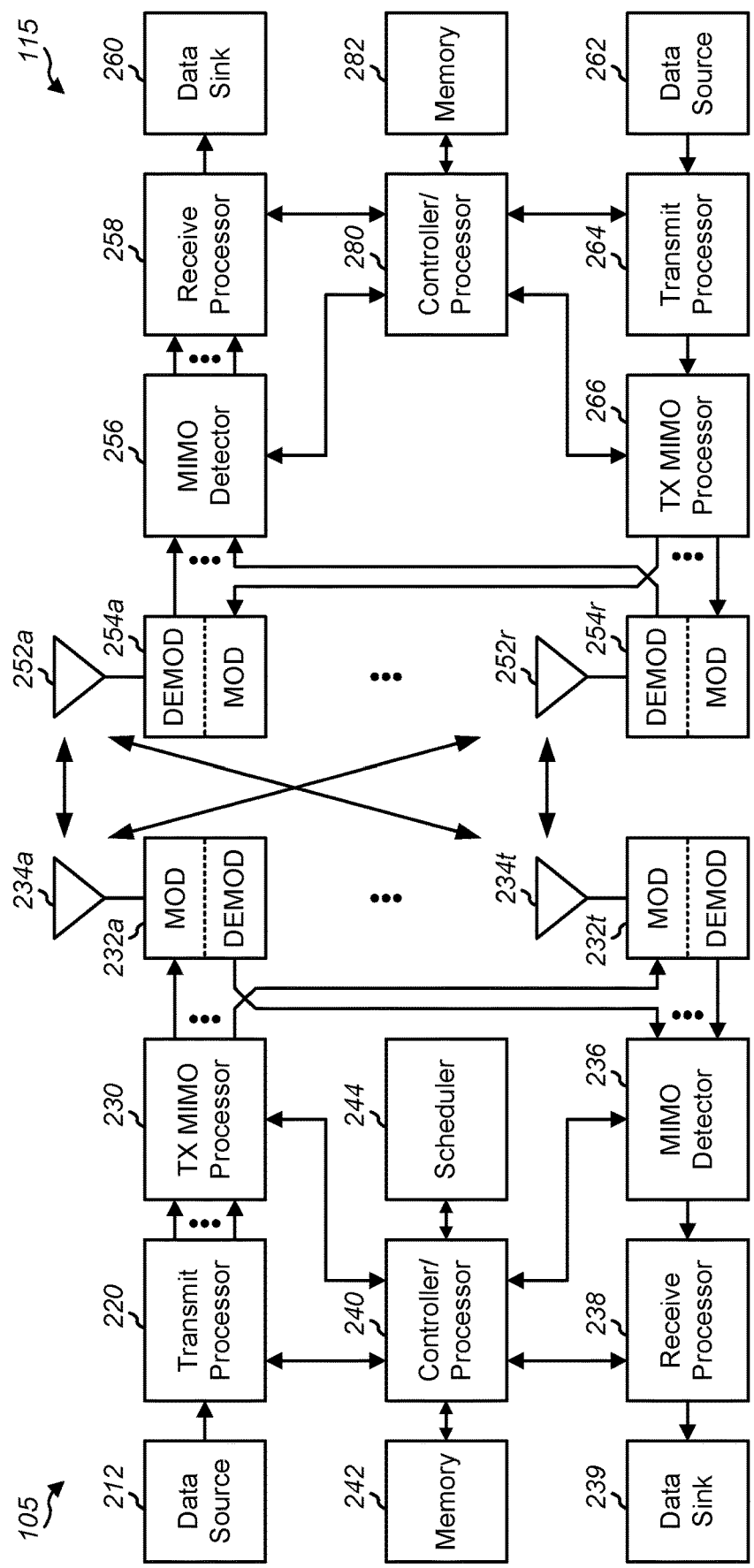
FIG. 2 is a block diagram conceptually illustrating a design of a base station and a UE configured according to some aspects of the present disclosure.

FIG. 2 shows a block diagram conceptually illustrating an example design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. For example, spatial processing performed on the data symbols, the control symbols, or the reference symbols may include precoding.

Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, the antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the physical uplink shared channel (PUSCH)) from data source 262 and control information (e.g., for the physical uplink control channel (PUCCH)) from controller/processor 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 280 and/or other processors and modules at UE 115 may perform or direct the execution of various processes for the techniques described herein, such as to perform or direct the execution illustrated in FIG. 7, and/or other processes for the techniques described herein. Memories 242 and 282 may store data and program codes for base station 105 and UE 115, respectively. Scheduler 244 may schedule UEs for data transmission on the downlink and/or uplink.

Transmit power and power amplifier (PA) efficiency are both impacted at a wireless device (e.g., base station 105, UE 115, etc.) transmitting a signal due to peak-to-average power ratio (PAPR) characteristics of the waveforms employed. The PAPR of the signal waveform, as may be determined from the peak amplitude squared (i.e., the peak power) divided by the RMS value squared (i.e., the average power), is correlated to the quality of the waveform and the wireless device emissions. An OFDM waveform, for example, suffers from relatively large PAPR (e.g., PAPR in the range of 10 dB). Cyclic prefix OFDM (CP-OFDM) waveforms in particular typically have high PAPR due to the random addition of subcarriers in the time-domain. PAPR with respect to OFDM signals grows rapidly by the size of the transport block. 5G NR aims for higher data-rates than LTE, resulting in the use of larger OFDM block-sizes, further increasing the PAPR. Even for low modulation coding scheme (MCS) transmissions that are not particularly demanding with respect to signal quality (e.g., do not need high error vector magnitude (EVM)), PA efficiency and transmit power are both limited by the resulting PAPR of the signal waveform.

Figure 3B:
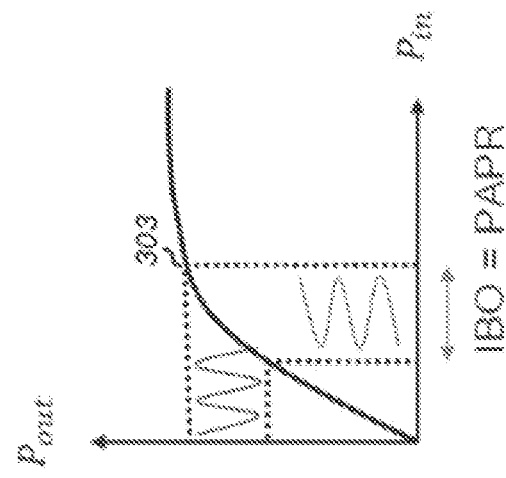
FIGS. 3B-3D are graphs illustrating the effects of various levels of input backoff (IBO).
Figure 3D:
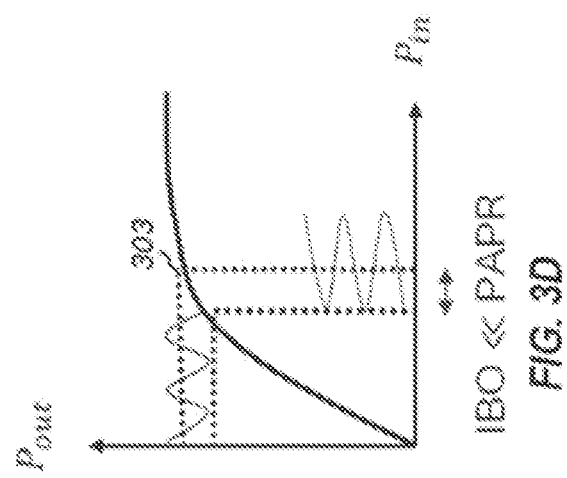
Figure 3A:
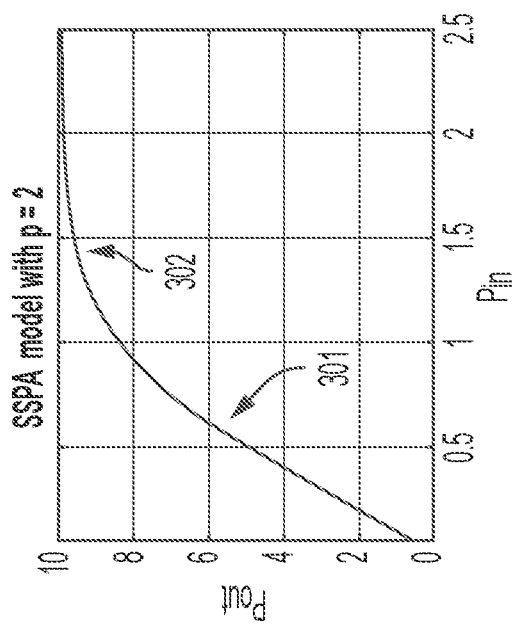
FIG. 3A is a graph showing a linear region and a non-liner region of an example solid state power amplifier.

A PA has a limited dynamic range, as represented by the power output (Pout) versus power input (Pin) graph of FIG. 3A showing linear region 301 and non-liner region 302 of an example solid state PA (S SPA). Accordingly, PAs generally exhibit non-linear behavior if operated at very high input power. If a PA is not operated in its linear region, the signal peaks may leak into the non-linear region of the PA causing in-band and out-of-band distortion of the signal, degraded EVM at the receivers, etc. For example, this signal distortion may introduce inter-modulation among the sub-carriers and out-of-band emission. Since OFDM signals have a high PAPR, these signals in particular could be clipped in the transmitter PA, because of its limited dynamic range or non-linearity.

Figure 3C:
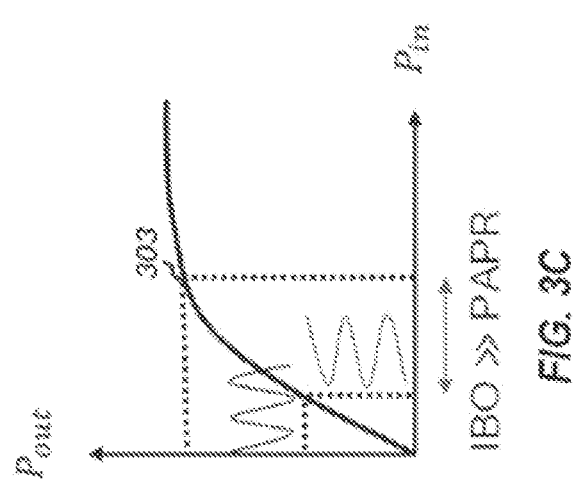

PA back-off may be utilized to prevent performance degradation and inter-modulation products leaking into adjacent channels. For example, to avoid the non-linearity, the PA may be operated at a mean input power that is several dB lower than the saturation point. If a signal has a PAPR of x dB, an input backoff (IBO) of x dB may be implemented to avoid the non-linearity even at the peak of the input signal, as illustrated in FIG. 3B showing that when IBO=PAPR the peaks of the input signal power (Pin) and output signal power (Pout) remain at or below PA saturation point 303. Such PA back-off, however, may come at the cost of the degraded PA efficiency as shown in FIG. 3C showing that when IPB<<PAPR the peaks of the input signal power (Pin) and output signal power (Pout) remain appreciably below PA saturation point 303, which is an inefficient use of the PA (e.g., gain within the PA dynamic range remains unused). Insufficient PA backoff results in the PA being driven into saturation and the associated signal distortion, as shown in FIG. 3D showing that when IBO<<PAPR the peaks of the input signal power (Pin) and output signal power (Pout) exceed PA saturation point 303.

Many existing PAPR reduction techniques are data-dependent and computationally expensive, making them unfit for a real-time implementation. As a result, clipping and filtering (CF) is most commonly used for PAPR reduction with respect to wireless communication networks. CF, however, results in in-band distortion and is not guaranteed to converge to a desirable solution.

Compared to the previous generation of cellular networks, 4G-LTE and 5G-NR provide an abundance of bandwidth both in the uplink and downlink. This is true both due to the addition of FR2 in 5G NR as well as increasing the available bandwidth to 100 MHz in the spectrum under 6 GHz (sub6) frequencies. This excess bandwidth is partially exploited by using longer OFDM symbols, which further increases the PAPR for OFDM. However, the excess bandwidth can also be exploited for PAPR reduction, such as using a PAPR reduction technique known as tone reservation.

Tone reservation is a signal processing technique for providing PAPR reduction in which a transmitter utilizes some of the otherwise-idle tones for reducing the PAPR. For example, in implementing tone reservation, given a set of data tones of a time-domain signal transmitted by a wireless device, a dedicated set of additional tones (referred to as peak reduction tones (PRTs)) orthogonal to the data tones are used by the wireless device to shape the time-domain signal. PRTs in time-domain may be designed to clip a portion of the peak of the original waveform so that the peak power is reduced at the cost of the increased average transmit power, if the EVM is maintained for the data tones. Using such PRTs, the EVM of the data tones can be protected without the receiver wireless device knowing exactly what is transmitted as the PRTs. Accordingly, the PRTs may include a set of additional tones having no relation to the data tones, whereby the receiver simply ignores the signal on the PRTs and only decodes the data tones. Given that there is no overlap between the data tones and PRTs, this tone reservation technique generally does not introduce any EVM or adjacent channel leakage power ratio (ACLR).

The effectiveness of tone reservation PAPR schemes depends on the number, location (e.g., frequency), magnitude (e.g., signal power), and phase (e.g., waveform relative displacement) of the PRT tones used with respect to a particular transmission signal. The carrier resources for the PRTs are taken from resources allocated for data transmission by the wireless device. Thus, the carrier resources available for the PRTs of a tone reservation PAPR scheme, and correspondingly the number of PRTs utilized with respect to any particular transmission signal, can be very limited. Computing optimized locations for PRT tones to be used with respect to data tones of a transmission signal is computationally expensive and challenging to implement in real-time, particularly by a UE having limited computing and power resource.

In accordance with aspects of the disclosure, one or more preconfigured or fixed index allocations for PRTs (e.g., providing PRT location sequences, thus fixing the number and location of PRTs) may be provided for use in PAPR reduction with respect to various transmission signal waveforms. For example, an index allocation of PRTs of some implementations may provide a universally good, although perhaps not optimized, PRT location sequence for PAPR reduction. In accordance with some aspects of the disclosure, a base station may select or otherwise designate one or more PRT location sequences to be utilized. The magnitude and the phase of the PRTs of a PRT location sequence may be adjusted for each symbol of a corresponding transmission signal when using such a PRT location sequence for PAPR reduction with respect to the transmission signal. For example, a transmitting device (e.g., UE 115 in an uplink or base station 105 in a downlink) implementing PAPR reduction may optimize the magnitude and the phase of the PRTs for a given OFDM symbol to minimize the PAPR of the OFDM waveform. Fixing the locations (e.g., PRT frequency) of the PRTs in advance (e.g., in a communication standard or communication protocol, by agreement or signaling between wireless devices, etc.) according to aspects of the present disclosure can significantly improve the complexity of a transmitter implementing a tone reservation PAPR scheme. For example, a transmitting device implementing PAPR reduction, such as a UE having limited computing and/or power resources, is relieved of a need to determine an appropriate or optimum PRT location sequence (e.g., determining the number and location of PRTs), and instead performs PRT magnitude (e.g., PRT signal power) and phase (e.g., PRT waveform relative displacement) optimization processing. That is, the PRT locations may be fixed (e.g., fixed in a communication standard, communication protocol, etc.) so there is no need for a transmitting device implementing PAPR reduction to perform optimization of the PRT locations in real-time, and instead may only perform optimization processing with respect to magnitude and phase of the PRTs in real-time for each OFDM symbol.

In an example, UE 115 may have been granted 2 resource blocks (RBs) equaling 24 tones for transmission of uplink information, and is to use half of the available tones as PRTs for PAPR reduction with respect to a signal to be transmitted by the UE. In accordance with a typical tone reservation scheme, the UE may choose any subset of the 24 available tones for use as PRTs as long as the base station is made aware of this choice (e.g., through signaling). In accordance with some aspects of the disclosure, UE 115 may use a predefined PRT location sequence configuration (e.g., selected or otherwise designated by base station 105 and identifying a number of PRTs and their location within the allocated RBs) in identifying a subset of available tones for use as PRTs. The PRTs may be processed by UE 115 with data tones for generating a waveform for uplink signal transmission. FIG. 4 shows example signal 400 in the frequency-domain wherein 12 data tones (shown as data tones 401) are provided with a PRT location sequence of 12 tones (shown as PRTs 402) in a RB grant equaling 24 tones for PAPR reduction with respect to a transmission signal. In the illustrated example, the PRT location sequence provides a PRT inband location sequence configuration relative to the data tones in which PRTs are distributively located, interleaved with the data tones. UE 115 may, for example, generate the signal transmission waveform by taking the inverse fast Fourier transform (IFFT) of signal 400 including data tones 401 and PRTs 402.

Having the number of PRTs and their locations predetermined, such as through the use of one or more PRT location sequences, a transmitting device implementing PAPR reduction according to some aspects of the disclosure may perform PRT magnitude and phase optimization processing using various techniques. For example, a signal to clipping noise ratio, tone reservation (SCR-TR) algorithm may be utilized to optimize PRTs (e.g., phase and magnitude) with respect to data tones of a transmission signal.

In an example implementation of a SCR-TR algorithm for tone reservation, a transmitting device (e.g., UE 115) may be granted tones $\{1, \ldots, N\}$. A PRT location sequence may identify a subset ($\Phi$) of $\{1, \ldots, N\}$ corresponding to the PRT locations, wherein the data tones may comprise the remaining tones, $\{1, \ldots, N\} \backslash \Phi$. A frequency-domain kernel (P) for the location of the subset of PRTs ($\Phi$) of a PRT location sequence may be constructed as follows:

$$P_i = \begin{cases} 1 & \text{if} \quad i \in \Phi \\ 0 & \text{if} \quad i \in [N] \backslash \Phi \end{cases} \quad (1)$$

A time-domain kernel (p) for the subset of PRTs ($\Phi$) of the PRT location sequence may be constructed by taking the IFFT of the frequency-domain kernel (P), wherein p=ifft(P). In this example, the frequency-domain data may be represented by X, wherein $X_i$=0, if i∈1. The time-domain data may be represented by x, wherein x=ifft(X).

The time-domain kernel (p) may be configured to approximate a delta function with negligible side-lobes by selecting a sufficiently large number of PRTs (e.g., a ratio of PRTs to data tones dependent on various factors, such as 25% or the number of PRTs being approximately a quarter of the number of data tones in some examples) and properly choosing the PRT locations. Accordingly, PRT location sequences provided according to some aspects of the disclosure comprise PRTs in a number and having locations selected to produce a time-domain kernel (p) appropriately shaped for PAPR reduction.

PRT location sequences according to some aspects of the disclosure may utilize a pseudo-random pattern of PRTs, or other non-uniformly distributed pattern of PRTs (e.g., PRTs distributively located according to a Costas array, a Golomb ruler, etc.) for configuring the PRT location sequence (e.g., fixing the locations of the PRTs) to yield a sharp and narrow kernel in the time-domain for PRT magnitude and phase optimization processing, such as using a SCR-TR technique. For example, the random or non-uniform locations of the PRTs may be utilized to provide a reasonable trade-off between the width of the main-lobe and the magnitude of the side-lobes. Additionally or alternatively, PRT location sequences according to some aspects of the disclosure may utilize a contiguous pattern of PRTs for configuring the PRT location sequence (e.g., fixing the locations of the PRTs) to yield a well-defined kernel in the time-domain for PRT magnitude and phase optimization processing, such as using a SCR-TR technique. For example, the contiguous locations of the PRTs may be utilized to provide a suitably large number of PRTs within a bandwidth of a component carrier for which the data tones are contiguous, for which PRTs are to be provided out-of-band with respect to the data tones, etc.

Figure 5:
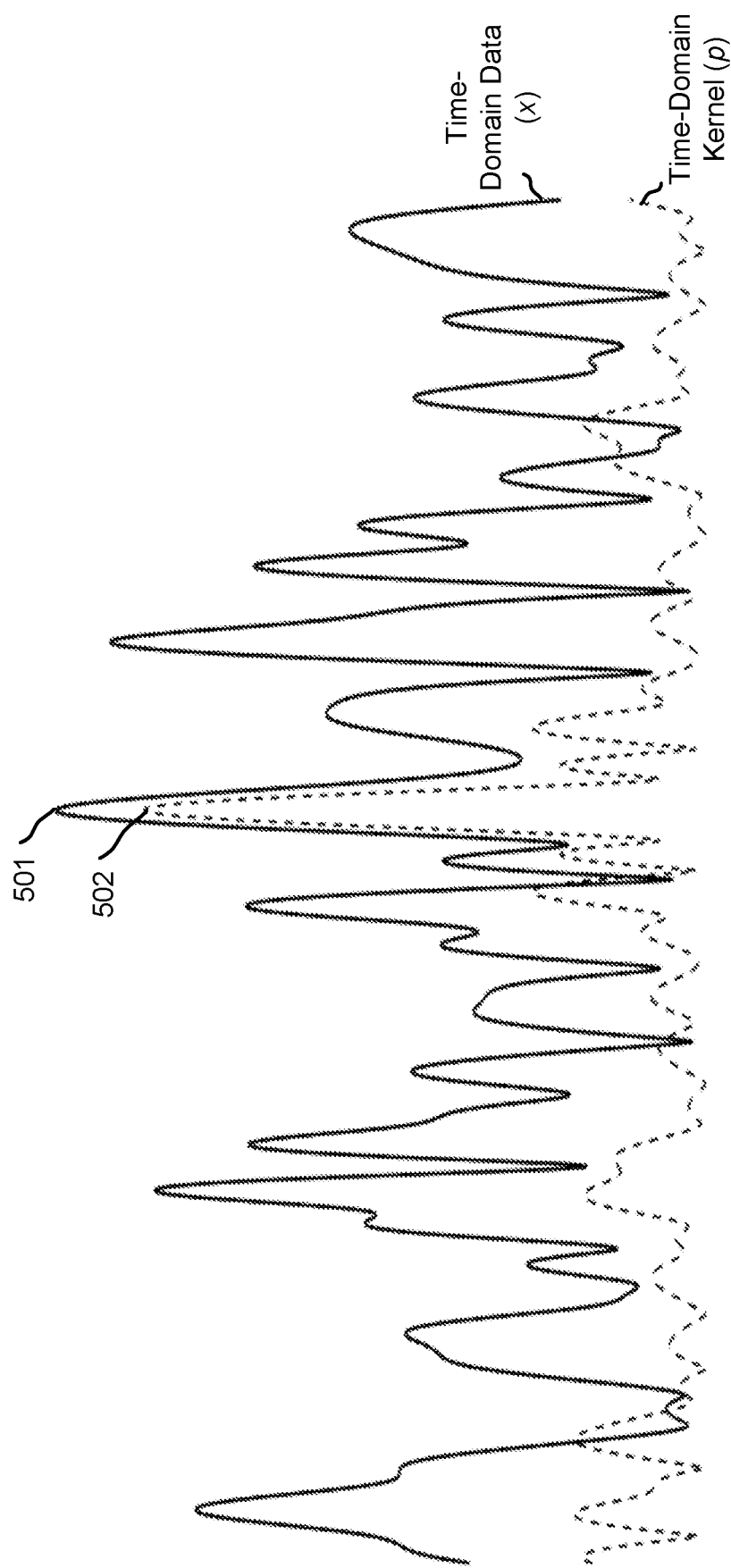
FIG. 5 is a graph showing circularly shifting a time-domain kernel (p) for PRT magnitude and phase optimization processing using a SCR-TR algorithm according to some aspects of the present disclosure.

Circularly shifting the time-domain kernel (p) in the time-domain disturbs the phase of the PRTs in the frequency-domain, but does not impact the location of PRTs in the frequency-domain. Accordingly, circularly shifting of the time-domain kernel (p) may be utilized for PRT magnitude and phase optimization processing using a SCR-TR algorithm according to some aspects of the disclosure. For example, a SCR-TR algorithm implemented by PRT magnitude and phase optimization processing logic (e.g., logic of a transmitting device, such as UE 115, base station 105, etc.) may operate to find the location of the largest peak of the time-domain data (x) (e.g., peak 501 of time-domain data signal (x) shown in FIG. 5), wherein j∈[N] represents the index of the location of the largest peak of the time-domain data. Having located the largest peak of the time-domain data (x), the time-domain kernel (p) may be circularly shifted so that the peaks are aligned (e.g., peak 502 of time-domain kernel (p) aligned with peak 501, as shown in FIG. 5), wherein p'=circshift(p,j). The shifted time-domain kernel (p) may be scaled and subtracted from the time-domain data (x) to obtain $X_{NEW}$ as follows:

$$x_{NEW} = x - \frac{|x(j)| - \mu}{p(0)} p^j e^{i \angle x(j)}, \quad (2)$$

where μ is the target peak, <x(j) is the phase of x(j) and i=√−1

The foregoing SCR-TR algorithm may be applied iteratively by PRT magnitude and phase optimization processing implemented according to some aspects of the disclosure. For example, the SCR-TR algorithm may be iterated several times, each with respect to a next largest peak of the time-domain data (x) to reduce several peaks.

Figure 6B:
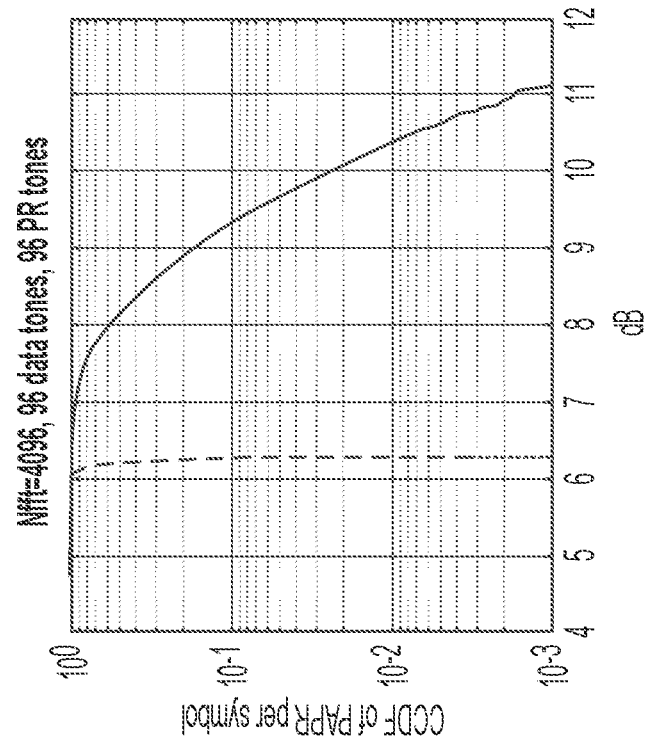
FIGS. 6A-6D are graphs illustrating PAPR reduction resulting from use of PRT location sequences and PRT magnitude and phase optimization processing using a SCR-TR algorithm according to some aspects of the present disclosure.
Figure 6A:
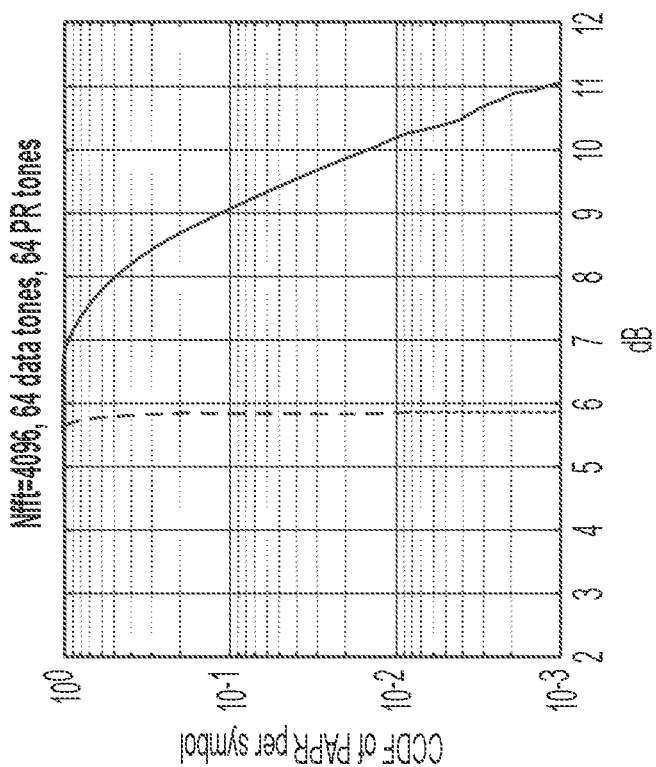
Figure 6D:
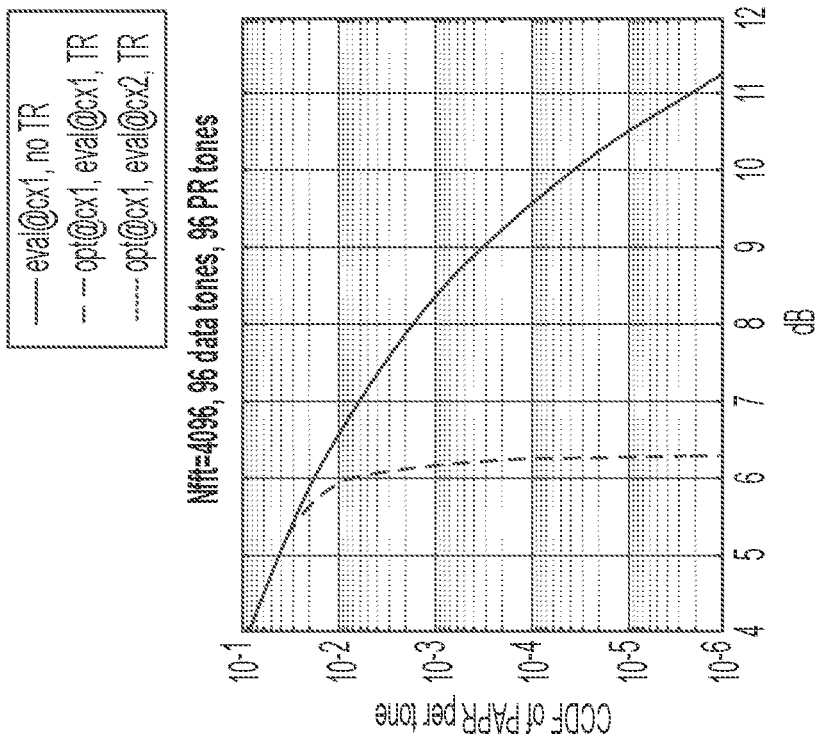
Figure 6C:
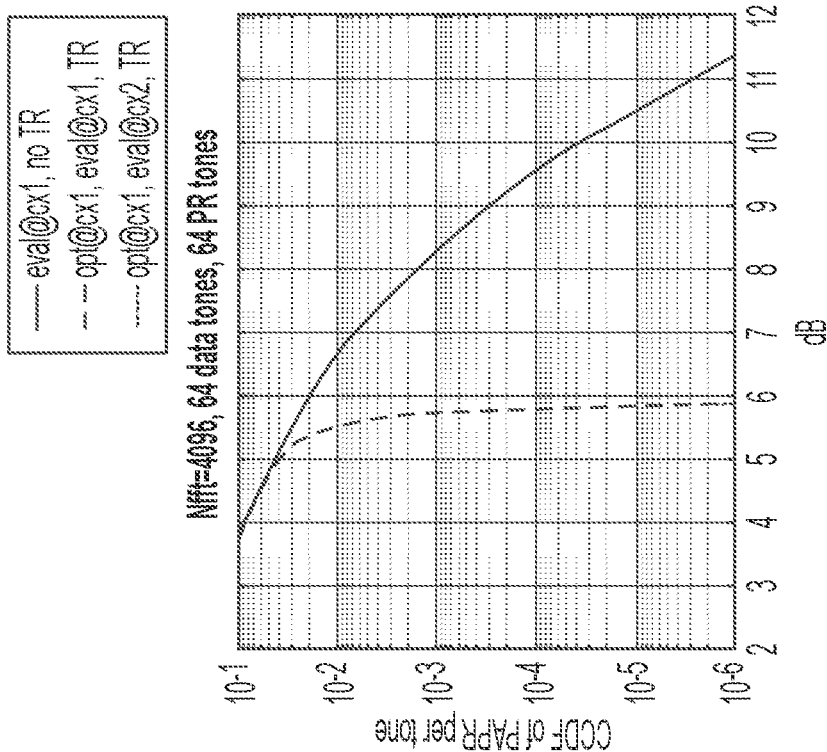

FIGS. 6A-6D illustrate PAPR reduction resulting from use of PRT location sequences and PRT magnitude and phase optimization processing using a SCR-TR algorithm according to some aspects of the disclosure. In particular, FIGS. 6A and 6B show PAPR reduction per symbol according to examples with 64 data tones and a PRT location sequence of 64 tones (FIG. 6A) and with 96 data tones and a PRT location sequence of 96 tones (FIG. 6B). FIGS. 6C and 6D show instantaneous PAPR reduction according to examples with 64 data tones and a PRT location sequence of 64 tones (FIG. 6C) and with 96 data tones and a PRT location sequence of 96 tones (FIG. 6D). It can be seen from the graphs of FIGS. 6A-6D that use of PRT location sequences and PRT magnitude and phase optimization processing using a SCR-TR algorithm can provide PAPR reduction on the order of 5 dB.

As previously mentioned, in some aspects of the disclosure, wireless communication that utilizes orthogonal frequency-division multiplexing (OFDM) may exhibit a high PAPR. A high PAPR is typically undesirable because it often requires large reductions of transmission power, which in turn may result in reduced transmission power efficiency and/or reduced overall transmission data rate.

As mentioned above, PAPR may be reduced in many ways, such as through the use of PRTs. As disclosed herein, a tone may refer to a signal transmitted at a certain frequency resource, e.g., a subcarrier, and a PRT may refer to a tone transmitted to reduce a time-domain peak of another signal, such as a data signal. That is, a PRT may adjust the shape of the time-domain representation of the data signal such that a time-domain peak of the data signal is reduced. Many PRTs may be transmitted to reduce many peaks in a signal, e.g., to adjust the shape of the time-domain representation of the data signal. For example, data may be transmitted using certain frequency resources in the frequency domain, and that transmitted data may be associated with a certain time-domain representation, e.g., a time-domain data signal. Along with the data, PRTs may be transmitted using frequency resources in the frequency domain. In the time domain, when the time-domain representation of the transmitted PRTs is combined with the time-domain representation of the transmitted data signal, the PRTs may reduce some of the peaks of the time-domain data signal. As a result, the PAPR associated with transmission of the data signal may be reduced.

In some aspects of the disclosure, a UE may use sideband PRTs, e.g., as illustrated in FIG. 8 below. According to some aspects, the energy in sideband PRTs may need to be sufficiently low so as to avoid interference to other UEs transmitting within the same band or in adjacent bands. For example, limitations imposed on UEs transmitting PRTs in sidebands may be associated with in-band emission (IBE) masks, adjacent channel leakage ratio (ACLR), and/or a spectrum emission mask (SEM). In some aspects, the limitations imposed on UEs transmitting PRTs in sidebands may be relaxed if there is significant path loss associated with communication between a UE and a base station. For example, a UE may be able to transmit higher power on the sideband PRTs without causing significant interference to the other UEs when there is significant path loss associated with communication between the UE and a base station. In some aspects, inserting higher power on the sideband PRTs may help the UE achieve a better PAPR which may improve transmission power efficiency and/or overall transmission data rate.

Figure 7:
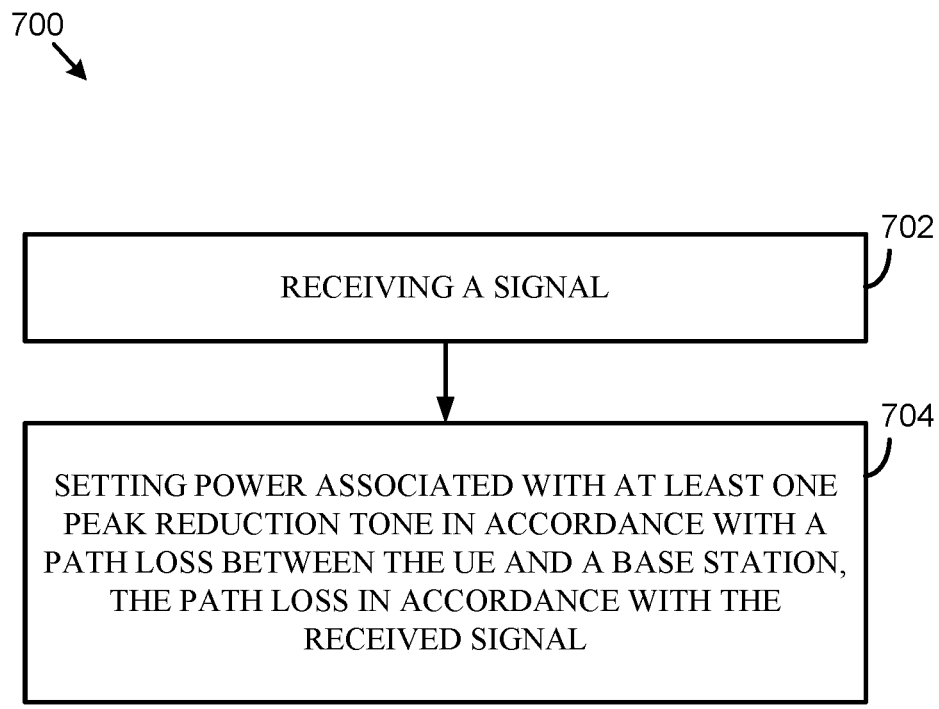
FIG. 7 is a block diagram illustrating a method for setting power of peak reduction tones (PRTs) in wireless communication systems according to some aspects of the present disclosure.

Aspects of the disclosure may provide enhanced techniques for setting power of PRTs. For example, in some aspects, the power associated with PRTs may be set based on the path loss associated with communication between a UE and a base station. FIG. 7, as an example, shows a block diagram illustrating a method for setting power of PRTs in wireless communication systems according to some aspects of the present disclosure. Aspects of method 700 may be implemented with various other aspects of this disclosure described with respect to FIGS. 1-2 and 9, such as a mobile device/UE. For example, with reference to FIG. 2, controller/processor 280 of UE 115 may control UE 115 to perform method 700.

Figure 9:
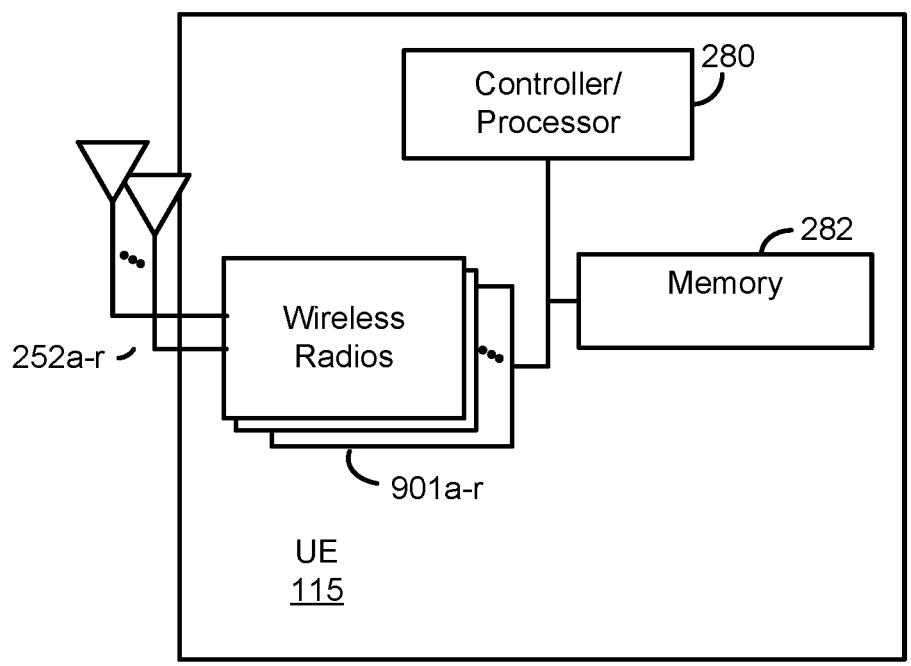
FIG. 9 is a block diagram conceptually illustrating a design of a UE configured according to some aspects of the present disclosure.

The example blocks of method 700 will also be described with respect to UE 115 as illustrated in FIG. 9. FIG. 9 is a block diagram conceptually illustrating a design of a UE configured according to some aspects of the present disclosure. UE 115 may include various structures, hardware, and components, such as those illustrated for UE 115 of FIG. 2. For example, UE 115 includes controller/processor 280, which operates to execute logic or computer instructions stored in memory 282. The controller/processor 280 can also control components of UE 115 that provide the features and functionality of UE 115. UE 115, under control of controller/processor 280, transmits and receives signals via wireless radios 901a-r and antennas 252a-r. Wireless radios 901a-r include various components and hardware, as illustrated in FIG. 2 for UE 115, including modulator/demodulators 254a-r, MIMO detector 256, receive processor 258, transmit processor 264, and TX MIMO processor 266. The controller/processor 280 can be provided with digital signals obtained from sampling received analog wireless signals for purposes of controlling communication operations.

FIG. 7 illustrates a method 700 that may be performed by a wireless communication device, such as a UE 115. Method 700 includes, at block 702, a UE receiving a signal. Method 700 also includes, at block 704, a UE setting power associated with at least one PRT based at least in part on a path loss, between the UE and a base station. The path loss is in accordance with the received signal.

In some aspects of the disclosure, the signal, e.g., the signal shown at block 702 of FIG. 7, may be at least one of a reference signal or at least part of a synchronization signal block (SSB). According to an aspect of the disclosure, the reference signal may be a reference signal for measuring path loss associated with uplink communication. For example, according to some aspects, the reference signal may be associated with an uplink communication channel and may provide an indication of path loss associated with the uplink communication channel. As a specific example, in some aspects, the uplink communication channel may be a physical uplink shared channel (PUSCH), and the reference signal may provide an indication of path loss associated with the PUSCH. For example, in some aspects, the reference signal may be the "PUSCH-PathlossReferenceRS" reference signal. In additional aspects, the reference signal may provide an indication of the path loss associated with communication between a UE and a base station, but may not be associated with the uplink communication channel, e.g., the PUSCH. For example, the UE may be provided with a reference signal for measuring path loss that is different than the reference signal used for measuring path loss associated with the PUSCH, e.g., the "PUSCH-PathlossReferenceRS" reference signal.

According to some aspects, the UE may obtain the path loss information from an SSB received by the UE. For example, in some aspects the signal, e.g., the signal shown at block 702 of FIG. 7, may refer to one or more signals within an SSB, e.g., the primary synchronization signal (PSS), the secondary synchronization signal (SSS), the master information block (MIB), and/or the demodulation reference signal (DMRS). For example, in one aspect, the UE may receive the path loss information in the MIB. In another aspect, the UE may determine the path loss information by processing one of the signals of the SSB. In additional aspects, the signal, e.g., the signal shown at block 702 of FIG. 7, may refer to the entire SSB, and the UE may determine the path loss information by processing the SSB.

As shown at block 704 of FIG. 7, the path loss between a UE and a base station may be determined in accordance with the received signal. In particular, as described above, the signal, whether it is a reference signal or at least part of a SSB, may indicate the path loss associated with communication between a UE and a base station. For example, the reference signal "PUSCH-PathlossReferenceRS" may indicate the path loss associated with communication between a UE and a base station. Based upon such indication, the UE may know the path loss associated with communication between the UE and a base station.

In some aspects of the disclosure, the UE may set the power associated with at least one PRT in accordance with the path loss, e.g., as shown at block 704 of FIG. 7. For example, the UE may set the magnitude associated with at least one PRT in accordance with the path loss.

According to some aspects, the UE may identify a power to set for the PRTs through the use of a look-up table. For example, the look-up table may include a correspondence between power values that may be used for the PRTs and associated path losses. As an example, a first path loss value may correspond to a first power in the look-up table, and a second path loss value may correspond to a second power in the look-up table. When the UE determines that the path loss associated with communication between the UE and a base station is approximately equally to the first path loss value, the UE may set the power to use for the PRTs to the first power value. Similarly, when the UE determines that the path loss associated with communication between the UE and a base station is approximately equally to the second path loss value, the UE may set the power to use for the PRTs to the second power value. In additional aspects, the look-up table may also account for other variables, such as a target PAPR and/or the number of PRTs. For example, the first power value may correspond to a first combination of a path loss value, a PAPR value, and/or a number of PRTs. Similarly, the second power value may correspond to a second combination of a path loss value, a PAPR value, and/or a number of PRTs, where at least one of the path loss value, PAPR value, and/or number of PRTs associated with the first combination is different than the path loss value, PAPR value, and/or number of PRTs associated with the second combination.

In additional aspects of the disclosure, a look-up table may not be used to determine the power to set for the PRTs based on the path loss. For example, in other aspects of the disclosure, an algorithm may use the determined path loss as an input and may output a power to use for PRTs based on the path loss input used by the algorithm. As an example, when the UE determines that the path loss associated with communication between the UE and a base station is approximately equally to a first path loss value, the UE may set the power to use for the PRTs to a first power value output by an algorithm that uses the first path loss value as an input. Similarly, when the UE determines that the path loss associated with communication between the UE and a base station is approximately equally to a second path loss value, the UE may set the power to use for the PRTs to a second power value output by an algorithm that uses the second path loss value as an input. In additional aspects, the algorithm may also account for other variables, such as a target PAPR and/or the number of PRTs. For example, the first output power value may correspond to a first input combination of a path loss value, a PAPR value, and/or a number of PRTs. Similarly, the second output power value may correspond to a second input combination of a path loss value, a PAPR value, and/or a number of PRTs, where at least one of the path loss value, PAPR value, and/or number of PRTs associated with the first input combination is different than the path loss value, PAPR value, and/or number of PRTs associated with the second input combination.

According to some aspects, the UE may set the power associated with at least one PRT in accordance with a parameter. The parameter, in some such aspects, may be determined in accordance with the path loss. For example, in some aspects, a UE may determine a parameter associated with the path loss in accordance with the path loss. According to aspects of the disclosure, the parameter may be a power offset (Poll) parameter or a path loss scaling factor (a) parameter. According to some aspects, the UE may identify the power parameter through the use of a look-up table. For example, the look-up table may include a correspondence between power parameters and associated path losses. As an example, a first path loss value may correspond to a first power parameter in the look-up table, and a second path loss value may correspond to a second power parameter in the look-up table. When the UE determines that the path loss associated with communication between the UE and a base station is approximately equally to the first path loss value, the UE may set the power to use for the PRTs based on the first power parameter. Similarly, when the UE determines that the path loss associated with communication between the UE and a base station is approximately equally to the second path loss value, the UE may set the power to use for the PRTs based on the second power parameter. The parameter, e.g., the $P_{off}$ parameter or the $\alpha$ parameter, may correspond to a particular power to be used for one or more PRTs. For example, the $P_{off}$ parameter or the $\alpha$ parameter may provide an indication of how much a power associated with one or more PRTs should be reduced or increased as a result of the determined path loss. In additional aspects, the look-up table may also account for other variables, such as a target PAPR and/or the number of PRTs. For example, the first power parameter may correspond to a first combination of a path loss value, a PAPR value, and/or a number of PRTs. Similarly, the second power parameter may correspond to a second combination of a path loss value, a PAPR value, and/or a number of PRTs, where at least one of the path loss value, PAPR value, and/or number of PRTs associated with the first combination is different than the path loss value, PAPR value, and/or number of PRTs associated with the second combination.

In additional aspects of the disclosure, a look-up table may not be used to determine the power parameter based on the path loss. For example, in other aspects of the disclosure, an algorithm may use the determined path loss as an input and may output a power parameter based on the path loss input used by the algorithm. As an example, when the UE determines that the path loss associated with communication between the UE and a base station is approximately equally to a first path loss value, the UE may determine a first power parameter using an algorithm that uses the first path loss value as an input. Similarly, when the UE determines that the path loss associated with communication between the UE and a base station is approximately equally to a second path loss value, the UE may determine a second power parameter using an algorithm that uses the second path loss value as an input. In additional aspects, the algorithm may also account for other variables, such as a target PAPR and/or the number of PRTs. For example, the first output power parameter may correspond to a first input combination of a path loss value, a PAPR value, and/or a number of PRTs. Similarly, the second output power parameter may correspond to a second input combination of a path loss value, a PAPR value, and/or a number of PRTs, where at least one of the path loss value, PAPR value, and/or number of PRTs associated with the first input combination is different than the path loss value, PAPR value, and/or number of PRTs associated with the second input combination.

According to some aspects, the UE may set the power associated with at least one PRT in accordance with at least one of an initial power indication or a maximum power indication. For example, in some aspects of the disclosure, a UE may receive from a base station at least one of an indication of an initial power ($P_o$) associated with at least one PRT or an indication of a maximum power ($P_{max}$) associated with the at least one PRT. In some aspects, the initial power indication $P_o$ may be a minimum power associated with the at least one PRT. According the some aspects, the UE may set the power associated with at least one PRT, whether set based on solely the path loss indication or a parameter (e.g., $P_{off}$ or a) associated with the path loss, based on at least one of an initial power indication or a maximum power indication by setting the power to be between (or equal to) the initial power indication $P_o$ and/or the maximum power indication $P_{max}$.

Figure 8A:
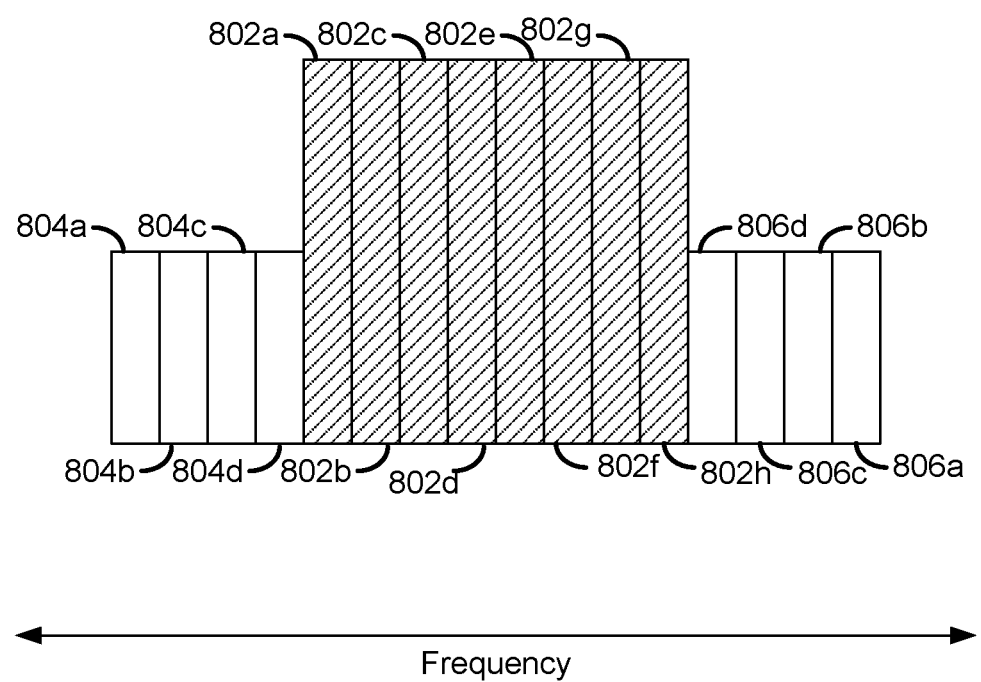
FIGS. 8A-8D are frequency-domain diagrams illustrating various PRT sideband location sequence configurations according to some aspects of the present disclosure.

In some aspects of the disclosure, a UE may use sideband PRTs. For example, FIGS. 8A-8D show frequency-domain diagrams illustrating various PRT sideband location sequence configurations according to some aspects of the present disclosure. As an example, FIG. 8A illustrates a first group of frequency resources associated with a first group 804 of PRTs and a second group of frequency resources associated with a second group 806 of PRTs. Between the first group 804 of PRTs and the second group 806 of PRTs are frequency resources allocated for uplink communication, which may be referred to as data tones 802. In some aspects, the data tones 802 may be associated with uplink communication, e.g., information transmitted over an uplink channel, such as the PUSCH. In some aspects of the disclosure, the at least one PRT shown at block 704 of FIG. 7 may refer to one or more of the PRTs in the first group 804 of PRTs and/or the second group 806 of PRTs. As illustrated in FIG. 8A, the power associated with the at least one PRT, e.g., one or more of the PRTs in the first group 804 of PRTs and/or the second group 806 of PRTs, may be the same for each of the at least one PRT.

Figure 8B:
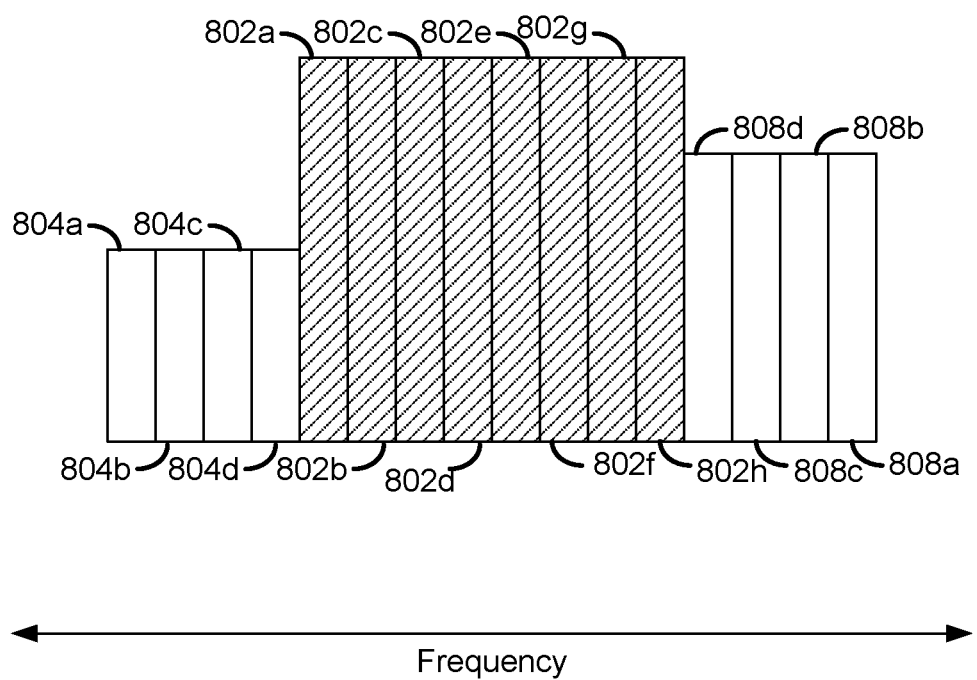

In some aspects of the disclosure, the power associated with at least one other PRT may be different than the power associated with the at least one PRT shown at block 704 of FIG. 7. As an example, FIG. 8B illustrates a first group of frequency resources associated with a first group 804 of PRTs and a second group of frequency resources associated with a second group 808 of PRTs. Between the first group 804 of PRTs and the second group 808 of PRTs are data tones 802. In some aspects of the disclosure, the at least one PRT shown at block 704 of FIG. 7 may refer to one or more of the PRTs in one of either the first group 804 of PRTs or the second group 808 of PRTs. As illustrated in FIG. 8B, the power associated with the at least one PRT, e.g., one or more of the PRTs in the first group 804 of PRTs, may be different than the power associated with at least one other PRT, e.g., one or more of the PRTs in the second group 808 of PRTs. In some aspects of the disclosure, just as the power associated with the at least one PRT, e.g., one or more of the PRTs in the first group 804 of PRTs, may be set in accordance with the path loss, the power associated with the at least one other PRT, e.g., one or more of the PRTs in the second group 808 of PRTs, may also be set in accordance with the path loss, as described above in this disclosure.

Figure 8C:
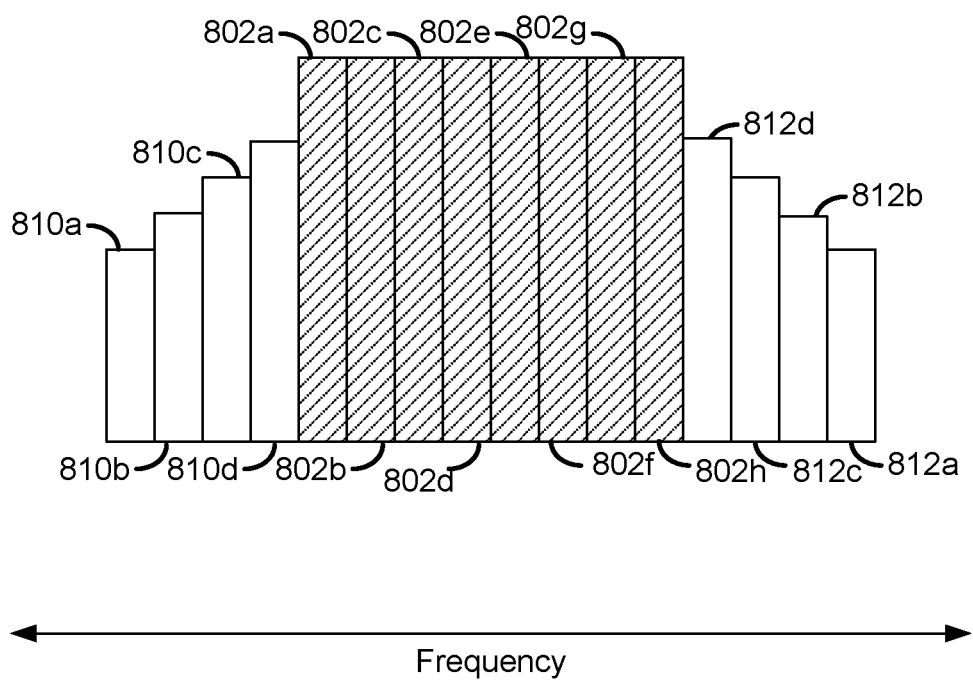

FIG. 8C illustrates a first group of frequency resources associated with a first group 810 of PRTs and a second group of frequency resources associated with a second group 812 of PRTs. Between the first group 810 of PRTs and the second group 812 of PRTs are frequency resources allocated for uplink communication, which may be referred to as data tones 802. In some aspects of the disclosure, the at least one PRT shown at block 704 of FIG. 7 may refer to one or more of the PRTs in the first group 810 of PRTs and/or the second group 812 of PRTs. As illustrated in FIG. 8C, the power associated with at least one PRT may be in accordance with the distance from the frequency resource associated with the at least one PRT to the frequency resource allocated for uplink communication, e.g., one or more of data tones 802. For example, in one aspect of the disclosure illustrated in FIG. 8C, the at least one PRT may correspond to PRT 810b of the first group 810 of PRTs or PRT 812b of the second group 812 of PRTs, and the frequency resource allocated for uplink communication may correspond to one of the outer frequency resources allocated for uplink communication, e.g., data tone 802a or 802h, or to the center frequency resource of the data tones. Both PRT 810b and PRT 812b are the same distance away from the outer frequency resources allocated for uplink communication, e.g., data tone 802a or 802h, respectively, or the center frequency resource of the data tones. As a result, both PRT 810b and PRT 812b may be set to have the same power. Similarly, both PRT 810c and PRT 812c are the same distance away from data tone 802a or 802h, respectively, or the center frequency resource of the data tones, and therefore may also be set to have the same power. However, in some aspects, because PRT 810c and PRT 812c are closer to the outer frequency resources allocated for uplink communication, or the center frequency resource of the data tones, than PRT 810b and PRT 812b, respectively, the power set for PRT 810c and PRT 812c may be larger than the power set for PRT 810b and 812b.

According to some aspects of the disclosure, at least one of the path loss, the parameter associated with the path loss, the initial PRT power indication $P_o$, or the maximum PRT power indication $P_{max}$ may be in accordance with a distance from a frequency resource associated with the at least one PRT to a frequency resource allocated for uplink communication, e.g., a frequency resource associated with a data tone. As an example, because the power associated with PRTs is set based on at least one of the path loss, the parameter associated with the path loss, the initial PRT power indication $P_o$, or the maximum PRT power indication $P_{max}$, one or more of the path loss, the parameter associated with the path loss, the initial PRT power indication $P_o$, or the maximum PRT power indication $P_{max}$ may also be a function of the distance from a frequency resource associated with the at least one PRT to a frequency resource allocated for uplink communication. For example, at least one of the path loss, the parameter associated with the path loss, the initial PRT power indication $P_o$, or the maximum PRT power indication $P_{max}$ used to set the power for PRT 810b or PRT 812b may be different than at least one of the path loss, the parameter associated with the path loss, the initial PRT power indication $P_o$, or the maximum PRT power indication $P_{max}$ used to set the power for PRT 810c or PRT 812c. In other words, at least one of the path loss, the parameter associated with the path loss, the initial PRT power indication $P_o$, or the maximum PRT power indication $P_{max}$ may be in accordance with a distance from a frequency resource associated with the at least one PRT to a frequency resource allocated for uplink communication such that the power associated with the at least one PRT is also in accordance with the distance from the frequency resource associated with the at least one PRT to the frequency resource allocated for uplink communication, as described in the previous paragraph.

Figure 8D:
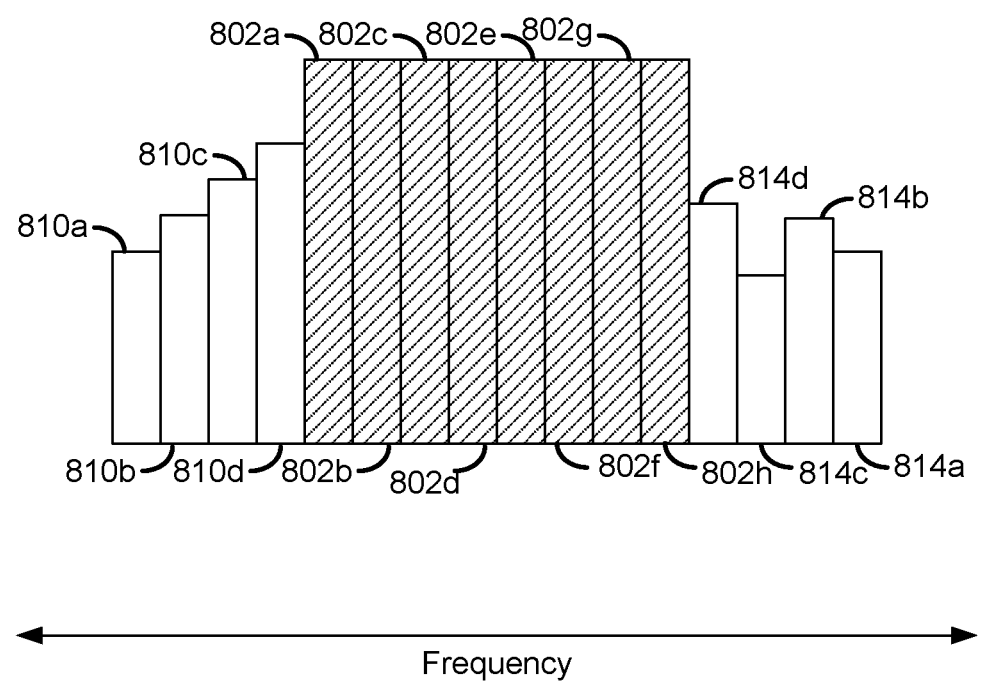

In some aspects, the power associated with at least one PRT, such as the at least one PRT shown at block 704 of FIG. 7, may resemble a mask of powers. For example, the powers associated with the first group 810 of PRTs in FIG. 8C may resemble a first mask, and the powers associated with the second group 812 of PRTs in FIG. 8C may resemble a second mask that is similar to the first mask. For example, in the power masks illustrated in FIG. 8C, the power associated with individual PRTs may be reduced as the frequency resources associated with PRTs move further away from the outer frequency resources allocated for uplink communication, e.g., data tone 802a or 802h, respectively, or the center frequency resource of the data tones, as illustrated in FIG. 8C. In other aspects of the disclosure, the mask of powers associated with PRTs on one side of the data tones 802 may be different than the mask of powers associated with PRTs on the opposite side of the data tones 802. For example, FIG. 8D provides an illustration of an aspect of the disclosure where a mask of powers associated with a first group 810 of PRTs on one side of data tones 802 is different than the mask of powers associated with a second group 814 of PRTs on the opposite side of data tones 802.

In some aspects of the disclosure, a frequency resource may refer to a subcarrier. In additional aspects of the disclosure, a frequency resource may refer to a resource block (RB), which may correspond to a group of subcarriers.

In some aspects, techniques for setting power of PRTs may include a UE receiving a signal. Techniques for setting power of PRTs may also include a UE setting power associated with at least one PRT in accordance with a path loss, between the UE and a base station. The path loss is in accordance with the received signal.

Techniques for setting power of PRTs may include additional aspects, such as any single aspect or any combination of aspects described below and/or in connection with one or more other processes described elsewhere herein.

In a first aspect, the signal may be at least one of a reference signal or at least part of a synchronization signal block.

In a second aspect, alone or in combination with the first aspect, the reference signal may be associated with an uplink communication channel and may provide an indication of path loss associated with the uplink communication channel.

In a third aspect, alone or in combination with one or more of the first and second aspects, the reference signal may provide an indication of the path loss and may not be associated with an uplink communication channel.

In a fourth aspect, alone or in combination with one or more of the first through third aspects, a UE may set power associated with at least one other PRT in accordance with the path loss. In some aspects, the power associated with the at least one other PRT may be different than the power associated with the at least one PRT.

In a fifth aspect, alone or in combination with one or more of the first through fourth aspects, a UE may determine a parameter associated with the path loss in accordance with the path loss. In some aspects, the power associated with the at least one PRT may also be set in accordance with the parameter.

In a sixth aspect, alone or in combination with one or more of the first through fifth aspects, at least one of the parameter or the path loss may be in accordance with a distance from a frequency resource associated with the at least one PRT to a frequency resource allocated for uplink communication such that the power associated with the at least one PRT may be in accordance with the distance from the frequency resource associated with the at least one PRT to the frequency resource allocated for uplink communication.

In a seventh aspect, alone or in combination with one or more of the first through sixth aspects, a UE may receive at least one of an indication of an initial power associated with the at least one PRT or an indication of a maximum power associated with the at least one PRT. In some aspects, the power associated with the at least one PRT may also be set in accordance with at least one of the initial power indication or the maximum power indication.

In an eighth aspect, alone or in combination with one or more of the first through seventh aspects, at least one of the initial power indication or the maximum power indication may be in accordance with a distance from a frequency resource associated with the at least one PRT to a frequency resource allocated for uplink communication such that the power associated with the at least one PRT may be in accordance with the distance from the frequency resource associated with the at least one PRT to the frequency resource allocated for uplink communication.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and modules described herein (e.g., the components, functional blocks, and modules in FIG. 2) may comprise processors, electronics devices, hardware devices, electronics components, logical circuits, memories, software codes, firmware codes, etc., or any combination thereof. In addition, features discussed herein may be implemented via specialized processor circuitry, via executable instructions, and/or combinations thereof.

Those of skill would further appreciate that the various illustrative logical blocks, modules, circuits, and algorithm steps (e.g., the logical blocks in FIG. 7) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be implemented directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A wireless communication method at a user equipment (UE), comprising:
   receiving a signal; and
   setting power associated with at least one peak reduction tone of a plurality of peak reduction tones in accordance with a first peak reduction tone power, wherein the first peak reduction tone power is provided in accordance with a path loss between the UE and a base station associated with the received signal and is different than a power setting for associated data tones, and wherein the plurality of peak reduction tones comprise a set of tones orthogonal to the associated data tones and configured to reduce a time-domain peak of a signal transmitting a symbol comprising the associated data tones.

2. The method of claim 1, wherein the received signal is at least one of a reference signal or at least part of a synchronization signal block.

3. The method of claim 2, wherein the reference signal is associated with an uplink communication channel and provides an indication of the path loss associated with the uplink communication channel.

4. The method of claim 1, further comprising:
   setting power associated with at least one other peak reduction tone of the plurality of peak reduction tones in accordance with a second peak reduction tone power, wherein the set of tones configured to reduce the time-domain peak of the signal transmitting the symbol comprising the associated data tones includes the at least one peak reduction tone and the at least one other peak reduction tone, and wherein the second peak reduction tone power associated with the at least one other peak reduction tone is different than the first peak reduction tone power associated with the at least one peak reduction tone.

5. The method of claim 1, wherein the first peak reduction tone power associated with the at least one peak reduction tone is set in accordance with a parameter associated with the path loss.

6. The method of claim 5, wherein the parameter associated with the path loss is in accordance with a distance from a frequency resource associated with the at least one peak reduction tone to a frequency resource allocated for uplink communication of a data tone of the associated data tones such that the first peak reduction tone power associated with the at least one peak reduction tone is in accordance with the distance from the frequency resource associated with the at least one peak reduction tone to the frequency resource allocated for the uplink communication of the data tone of the associated data tones.

7. The method of claim 1, further comprising:
receiving at least one of:
an indication of an initial peak reduction tone power; or
an indication of a maximum peak reduction tone power,
wherein the first peak reduction tone power associated with the at least one peak reduction tone is set in accordance with at least one of the indication of the initial peak reduction tone power or the indication of the maximum peak reduction tone power.

8. The method of claim 7, wherein one of the initial peak reduction tone power indication or the maximum peak reduction tone power indication is in accordance with a distance from a frequency resource associated with the at least one peak reduction tone to a frequency resource allocated for uplink communication such that the first peak reduction tone power associated with the at least one peak reduction tone is in accordance with the distance from the frequency resource associated with the at least one peak reduction tone to the frequency resource allocated for uplink communication.

9. An apparatus configured for wireless communication, the apparatus comprising:
means for receiving a signal; and
means for setting power associated with at least one peak reduction tone of a plurality of peak reduction tones in accordance with a first peak reduction tone power, wherein the first peak reduction tone power is provided in accordance with a path loss between the apparatus and a base station associated with the received signal and is different than a power setting for associated data tones, and wherein the plurality of peak reduction tones comprise a set of tones orthogonal to the associated data tones and configured to reduce a time-domain peak of a signal transmitting a symbol comprising the associated data tones.

10. The apparatus of claim 9, wherein the received signal is at least one of a reference signal or at least part of a synchronization signal block.

11. The apparatus of claim 10, wherein the reference signal is associated with an uplink communication channel and provides an indication of path loss associated with the uplink communication channel.

12. The apparatus of claim 10, wherein the reference signal provides an indication of the path loss and is not associated with an uplink communication channel.

13. The apparatus of claim 9, further comprising:
means for setting power associated with at least one other peak reduction tone of the plurality of peak reduction tones based at least in part on a second peak reduction tone power, wherein the set of tones configured to reduce the time-domain peak of the signal transmitting the symbol comprising the associated data tones includes the at least one peak reduction tone and the at least one other peak reduction tone, and wherein the second peak reduction tone power associated with the at least one other peak reduction tone is different than the first peak reduction tone power associated with the at least one peak reduction tone.

14. The apparatus of claim 9, wherein the first peak reduction tone power associated with the at least one peak reduction tone is set in accordance with a parameter associated with the path loss.

15. The apparatus of claim 14, wherein the parameter associated with the path loss is in accordance with a distance from a frequency resource associated with the at least one peak reduction tone to a frequency resource allocated for uplink communication of a data tone of the associated data tones such that the first peak reduction tone power associated with the at least one peak reduction tone is in accordance with the distance from the frequency resource associated with the at least one peak reduction tone to the frequency resource allocated for the uplink communication of the data tone of the associated data tones.

16. The apparatus of claim 14, further comprising:
means for receiving at least one of:
an indication of an initial peak reduction tone power; or
an indication of a maximum peak reduction tone power,
wherein the first peak reduction tone power associated with the at least one peak reduction tone is set in accordance with at least one of the indication of the initial peak reduction tone power or the indication of the maximum peak reduction tone power.

17. The apparatus of claim 16, wherein one of the initial peak reduction tone power indication or the maximum peak reduction tone power indication is in accordance with a distance from a frequency resource associated with the at least one peak reduction tone to a frequency resource allocated for uplink communication such that the first peak reduction tone power associated with the at least one peak reduction tone is in accordance with the distance from the frequency resource associated with the at least one peak reduction tone to the frequency resource allocated for uplink communication.

18. A non-transitory computer-readable medium having program code recorded thereon, the program code comprising:
program code executable by a computer for causing the computer to receive a signal; and
program code executable by the computer for causing the computer to set power associated with at least one peak reduction tone of a plurality of peak reduction tones in accordance with a first peak reduction tone power, wherein the first peak reduction tone power is provided in accordance with a path loss that is determined in accordance with the received signal and is different than a power setting for associated data tones, and wherein the plurality of peak reduction tones comprise a set of tones orthogonal to the associated data tones and configured to reduce a time-domain peak of a signal transmitting a symbol comprising the associated data tones.

19. The non-transitory computer-readable medium of claim 18, wherein the received signal is at least one of a reference signal or at least part of a synchronization signal block.

20. The non-transitory computer-readable medium of claim 18, further comprising:
program code executable by the computer for causing the computer to set power associated with at least one other peak reduction tone of the plurality of peak reduction tones in accordance with a second peak reduction tone power, wherein the set of tones configured to reduce the time-domain peak of the signal transmitting the symbol comprising the associated data tones includes the at least one peak reduction tone and the at least one other peak reduction tone, and wherein the second peak reduction tone power associated with the at least one other peak reduction tone is different than the first peak reduction tone power associated with the at least one peak reduction tone.

21. The non-transitory computer-readable medium of claim 18, wherein the first peak reduction tone power associated with the at least one peak reduction tone is set in accordance with a parameter associated with the path loss.

22. The non-transitory computer-readable medium of claim 18, further comprising:
program code executable by the computer for causing the computer to receive at least one of:
an indication of an initial peak reduction tone power; or
an indication of a maximum peak reduction tone power,
wherein the first peak reduction tone power associated with the at least one peak reduction tone is set in accordance with at least one of the indication of the initial peak reduction tone power or the indication of the maximum peak reduction tone power indication.

23. An apparatus configured for wireless communication, the apparatus comprising:
a processing system that includes at least one processor and
a memory coupled to the at least one processor, the processing system
configured to cause the apparatus to:
receive a signal; and
set power associated with at least one peak reduction tone of a plurality of peak reduction tones in accordance with a first peak reduction tone power, wherein the first peak reduction tone power is provided in accordance with a path loss that is determined in accordance with the received signal and is different than a power setting for associated data tones, and wherein the plurality of peak reduction tones comprise a set of tones orthogonal to the associated data tones and configured to reduce a time-domain peak of a signal transmitting a symbol comprising the associated data tones.

24. The apparatus of claim 23, wherein the received signal is at least one of a reference signal or at least part of a synchronization signal block.

25. The apparatus of claim 24, wherein the reference signal is associated with an uplink communication channel and provides an indication of the path loss associated with the uplink communication channel.

26. The apparatus of claim 23, wherein the processing system is further configured to cause the apparatus to:
set power associated with at least one other peak reduction tone of the plurality of peak reduction tones in accordance with a second peak reduction tone power, wherein the set of tones configured to reduce the time-domain peak of the signal transmitting the symbol comprising the associated data tones includes the at least one peak reduction tone and the at least one other peak reduction tone, and wherein the second peak reduction tone power associated with the at least one other peak reduction tone is different than the first peak reduction tone power associated with the at least one peak reduction tone.

27. The apparatus of claim 23, wherein the first peak reduction tone power associated with the at least one peak reduction tone is set in accordance with a parameter associated with the path loss.

28. The apparatus of claim 27, wherein the parameter associated with the path loss is in accordance with a distance from a frequency resource associated with the at least one peak reduction tone to a frequency resource allocated for uplink communication of a data tone of the associated data tones such that the first peak reduction tone power associated with the at least one peak reduction tone is in accordance with the distance from the frequency resource associated with the at least one peak reduction tone to the frequency resource allocated for the uplink communication of the data tone of the associated data tones.

29. The apparatus of claim 23, wherein the processing system is further configured to cause the apparatus to:
receive at least one of:
an indication of an initial peak reduction tone power; or
an indication of a maximum peak reduction tone power,
wherein the first peak reduction tone power associated with the at least one peak reduction tone is set in accordance with at least one of the indication of the initial peak reduction tone power or the indication of the maximum peak reduction tone power.

30. The apparatus of claim 29, wherein at least one of the initial peak reduction tone power indication or the maximum peak reduction tone power indication is in accordance with a distance from a frequency resource associated with the at least one peak reduction tone to a frequency resource allocated for uplink communication such that the first peak reduction tone power associated with the at least one peak reduction tone is in accordance with the distance from the frequency resource associated with the at least one peak reduction tone to the frequency resource allocated for uplink communication.

\* \* \* \* \*